July 16, 1963 R. A. PENDLETON 3,097,778
MECHANICAL APPARATUS
Filed March 18, 1960 3 Sheets-Sheet 1
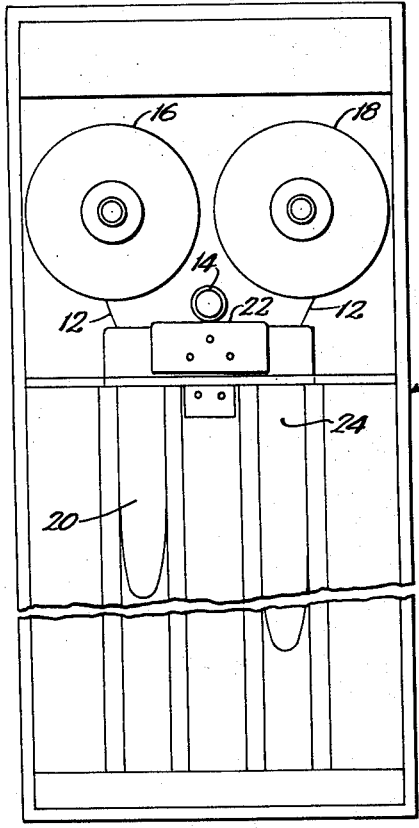
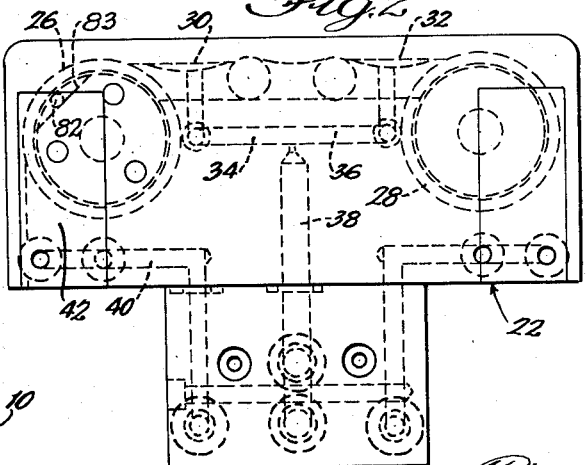
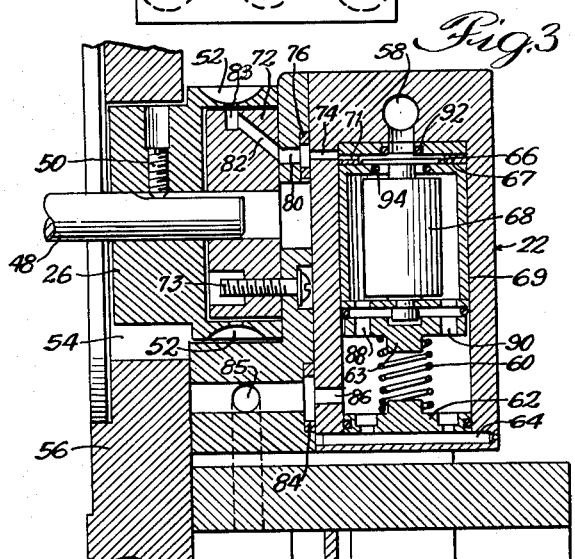
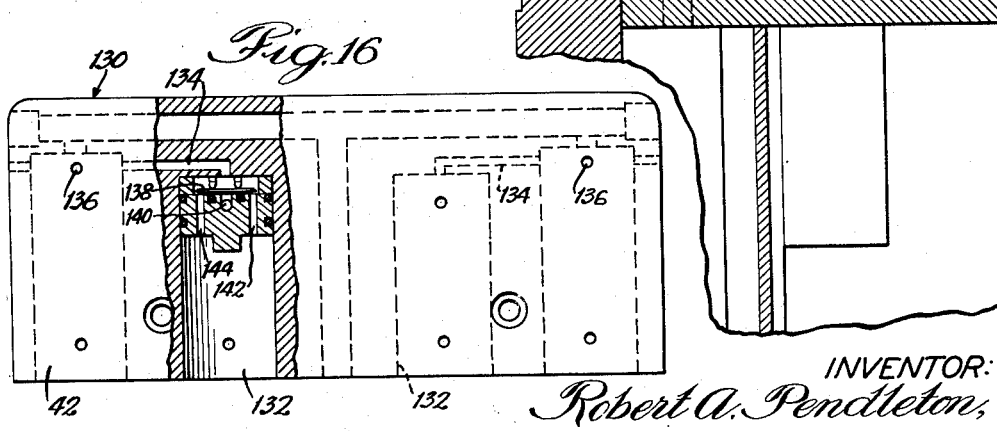
INVENTOR:
Robert A. Pendleton
Bair, Freeman & Molinare
BY
ATTORNEYS.

July 16, 1963 R. A. PENDLETON 3,097,778
MECHANICAL APPARATUS
Filed March 18, 1960 3 Sheets-Sheet 2
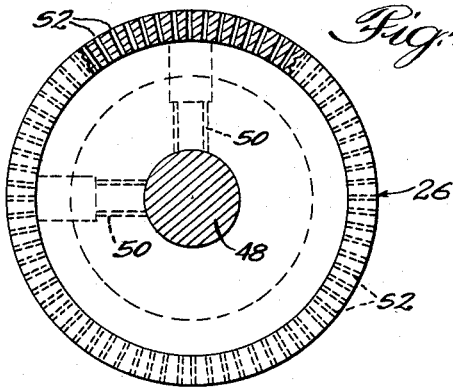
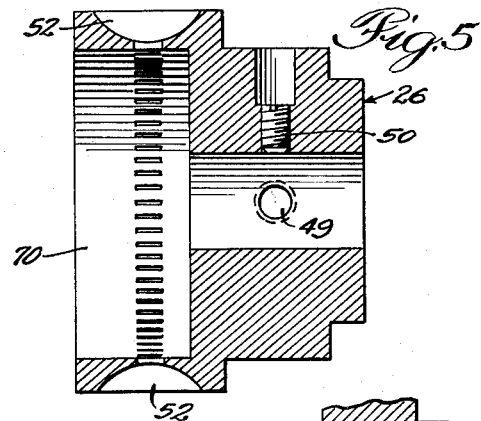
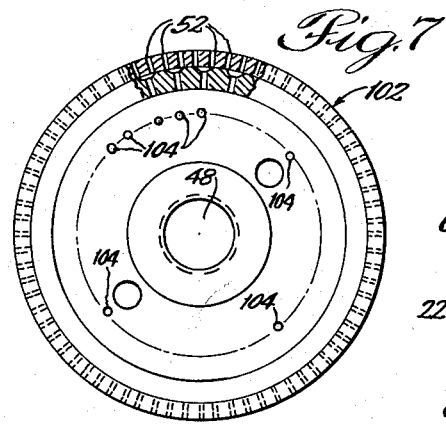
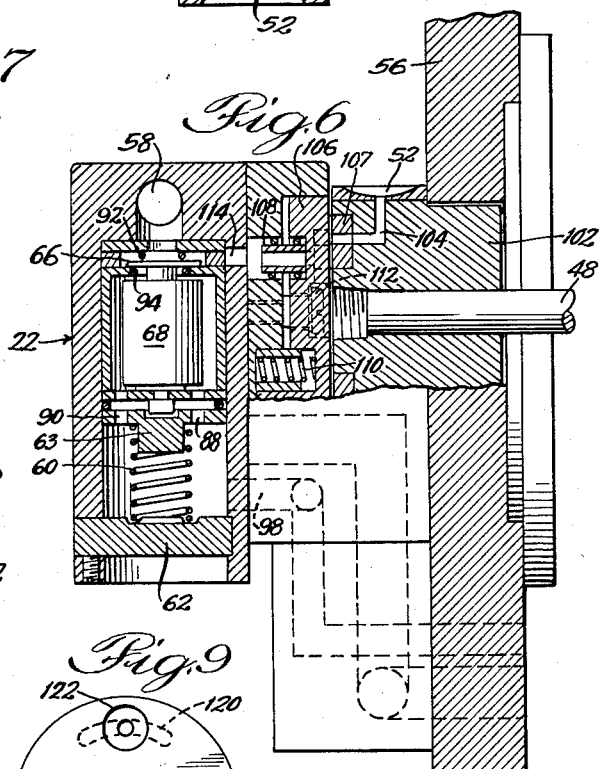
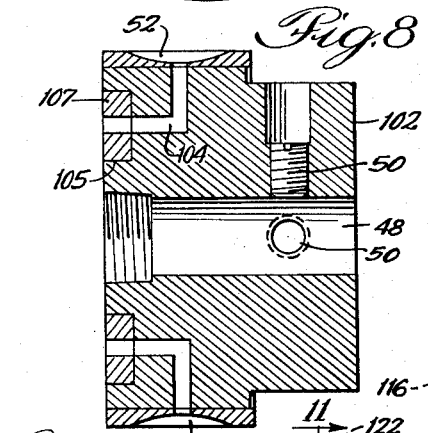
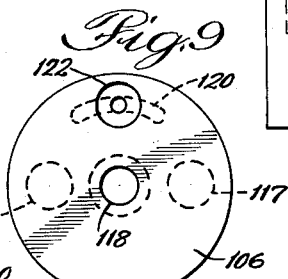
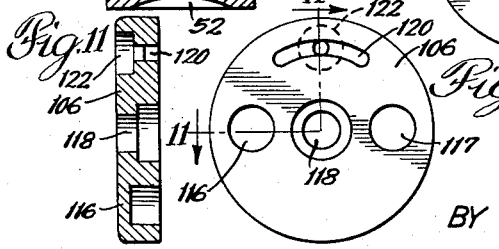
INVENTOR:
Robert A. Pendleton,
Bair, Freeman & Molinare
BY ATTORNEYS.

July 16, 1963 R. A. PENDLETON 3,097,778
MECHANICAL APPARATUS
Filed March 18, 1960 3 Sheets-Sheet 3
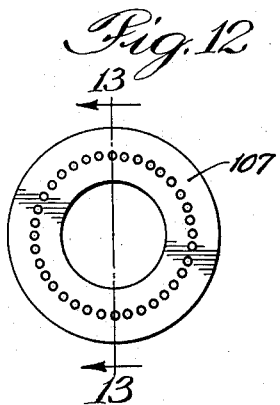
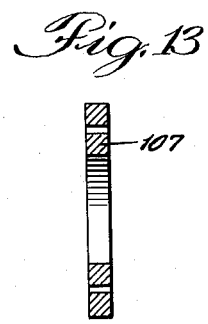
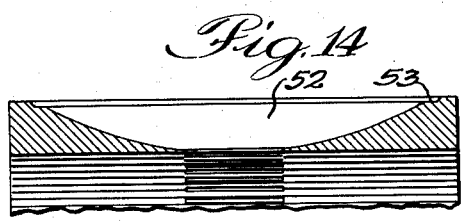
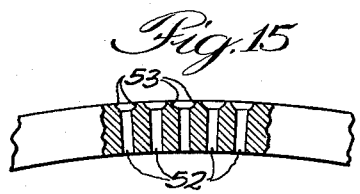
INVENTOR:
Robert A. Pendleton,
BY Bair, Freeman & Molinare
ATTORNEYS.

United States Patent Office 3,097,778
Patented July 16, 1963

3,097,778
MECHANICAL APPARATUS
Robert A. Pendleton, Dedham, Mass., assignor to Minneapolis-Honeywell Regulator Company, Minneapolis, Minn., a corporation of Delaware
Filed Mar. 18, 1960, Ser. No. 15,861
6 Claims. (Cl. 226—95)

This invention relates generally to apparatus for controlling the movement of a flexible, elongated strip member, and more particularly to new and improved pneumatic apparatus for controlling the movement of flexible, elongated tapes, such as record tapes of the type having information stored thereon.

Many devices are known in the field of informational data processing which are adapted to control the movement of information bearing magnetic tapes past suitable electromagnetic information transfer heads to effect the transfer of information from the associated data processing equipment to the tape and back again. It generally is desirable that the tape be brought up to speed or to rest smoothly, consistently, and in a minimum of time and distance. In addition, it is desirable to enable the tape to be started and stopped frequently—wherein the tape is subjected to high accelerations and decelerations—without causing the tape to be deflected and twisted from its normal path of travel with respect to the information transfer head.

Several devices have heretofore been disclosed for effecting the desirable ends set forth above. For example, the patent to Richard B. Lawrance and Robert A. Pendleton, bearing No. 2,837,330, discloses apparatus for controlling the movement of the magnetic tape comprising a pair of pneumatic, contra-rotating driving capstans and stationary pneumatic brake means disposed between said capstans on opposite sides of the transfer head. The top side of the tape is normally exposed to atmospheric pressure while the lower side will be subjected to the controlling pneumatic pressure of the movement control apparatus. These controlling pneumatic pressures may well be sub-atmospheric or vacuum pressure or above atmospheric pressures as explained in detail below. Both driving capstans and the brake are formed with perforations in the surface thereof and air passages in communication with said perforations are adapted to apply pneumatic pressure differentials to the tape by way of the perforations to either stop the tape or move it in a desired direction past the transfer head. Thus, when it is desired to have a brake or a capstan surface act on the tape, a pneumatic pressure differential is applied to the tape in such a manner as to cause the tape to move into engagement with the perforated surface of the activated element. This pressure differential is created, for example, by the application of a partial vacuum to the perforations by way of a suitable air passage under the control of selectively operable pneumatic switching apparatus.

It is a general object of this invention to provide a new and improved apparatus for controlling the movement of an information bearing magnetic tape which includes improved pneumatic switching means adapted to start and stop the tape smoothly and in a minimum of time.

It is a more specific object of this invention to provide a new and improved tape movement controlling apparatus comprising a pneumatically activated capstan surface having a plurality of grooves cut therein which are transverse to the path of tape travel, said grooves being uniformly spaced around the periphery of the capstan.

In accordance with one illustrative embodiment of this invention, the improved capstan assembly comprises a rotable capstan secured to the capstan drive motor and formed with a plurality of grooves uniformly spaced around the capstan circumferential surface. Advantageously, the grooves are transverse to the path of travel and parallel to the axis of rotation of the capstan. The rotating capstan is provided with a central recess portion within which is positioned a stationary seal commutator adapted to communicate selected pneumatic pressures to a predetermined set of the capstan grooves as determined by the actuation of pneumatic switching apparatus associated with the capstan assembly.

It is a feature of this embodiment of the invention that the rotatable capstan and its associated stationary seal commutator be positioned closely adjacent but in non-contacting relation with respect to each other to minimize frictional and other undesirable effects therebetween.

In accordance with another illustrative embodiment of the invention, the improved capstan assembly comprises a rotatable capstan having a plurality of grooves provided around the capstan circumferential surface and extending transverse to the path of rotation travel. The grooves on the circumference of the capstan are adapted to communicate through suitable internal passages with a suitably perforated seal or another surface of the capstan, forming the rotating portion of a pneumatic commutator. The latter is positioned in contacting relationship with a stationary seal commutator. The commutator is formed with an air passage which is adapted to communicate with air passages in the capstan such that pneumatic pressure differentials may be selectively applied to the capstan grooves by the actuation of pneumatic switching apparatus to selectively control the direction of tape movement.

The grooves formed in the surface of the capstans may be advantageously formed at the surface so that when they are activated, the tape adjacent the surface will be free to move against the capstan and no air will be entrapped between the tape and the capstan surface between the grooves. This transverse arrangement of the grooves and the formation thereof at their exposed edge provides better protection against tape skew than has heretofore been achieved in the art.

It is another object of this invention to provide a new and improved pneumatic switching apparatus for use with the pneumatic tape movement controlling capstan apparatus, described above.

It is still another object of this invention to provide a new and improved pneumatic switching apparatus comprising an electromagnetically actuated floating disk which serves in response to the energization of its associated coil to selectively apply differential pneumatic pressures to the capstan for controlling the direction of tape movement.

In accordance with a feature of this invention, the pneumatic switching apparatus comprises a freely movable or floating disk positioned in a pressure passage leading to the grooved capstan assembly. Advantageously, one side of the disk is in communication with a vacuum or suction source and the other side of the disk is in communication with a second pneumatic source of pressure higher than that of the pressure on top of the tape. In addition, the latter side of the disk advantageously is associated with an electrically energizable electromagnet which is adapted to be selectively energized to control the disk position.

In the operation of the pneumatic switching apparatus, when it is not desired to drive the tape by the capstan, the associated electromagnet is not excited and the disk is seated in sealing engagement with the vacuum opening. A pneumatic pressure which is above atmosphere is then communicated to the capstan and provides an air bearing for the tape insuring that it is not in driving engagement with the capstan.

When it is desired to drive the tape in the direction of capstan rotation, the electromagnet is electrically energized to open the vacuum port and to seat the disk in sealing engagement with the pressure opening, thereby permitting the vacuum to be communicated to the capstan grooves. The resultant lowered pneumatic pressure at the capstan surface, and the under surface of the tape together with the atmospheric pressure exerted on the top surface of the tape, causes the tape to move into engagement with the capstan surface, and the tape is driven in the desired direction. Accordingly, it can be seen that the free moving floating disk serves as a low mass and substantially frictionless valve to apply selectively either a vacuum or a pressure signal to the capstan in accordance with the energization of the electromagnet.

It is a further feature of this invention to provide new and improved pneumatic switching apparatus for a pneumatically operated tape capstan which comprises a floating disk valve having minimal mass and friction effect to enable the switching operation to be effected quickly, consistently, and at high rates in response to control signals.

It is a further object of this invention to provide such new and improved pneumatic switching apparatus, as above, which is adapted to be utilized in tape movement controlling apparatus of the type having vacuum pressures continuously applied to the brake devices of the apparatus.

As described above, the pneumatic switching apparatus comprises a primary floating disk valve actuator for selectively applying pneumatic pressure differentials to the capstan. In accordance with this embodiment of the invention, the pneumatic switching apparatus further comprises a secondary floating disk valve actuator in air communication with the primary actuator. The floating disk of the secondary actuator has one face thereof in air communication with the output of the primary actuator and the other face thereof in communication with a source of atmospheric pressure and the tape brake lane.

The capstan and brake assembly thus consists of four functional parts—the left counter-clockwise rotating capstan, the left stationary brake, the right stationary brake, and the right clockwise rotating capstan. Left and right refer to position relative to the magnetic information transfer head which is centrally located between the two stationary brake portions. The purpose of the two secondary actuators, which cause the pressure applied to a brake portion to depend inversely on the pressure applied to its adjacent capstan, is to provide automatically-operated means for furnishing a selective drag when the tape is moved in either direction. This selective drag is applied to the brake portion not adjacent to the driving capstan and thus serves to provide locally increased tape tension and improved contact between the tape and the information transfer head.

For example, when tape is being driven to the right, the right-hand capstan is provided with suction and the left-hand capstan is provided with air lubrication at a pressure above atmospheric. The left-hand secondary floating disk seals the left-hand brake lane port preventing atmospheric pressure from communicating to the left-hand brake and providing it with sub-atmospheric pressure to produce a drag on the tape. The right-hand secondary floating disk is meanwhile seated against the suction port and communicates atmospheric pressure to the right-hand brake portion, producing no drag. When tape is driven to the left, the situation is reversed. When tape is not being driven in either direction, both halves of the brake are provided with suction to bring the tape smoothly and rapidly to rest and maintain it at rest until a further drive signal is received at one or the other of the capstans.

Accordingly, it is a specific object of this invention to provide pneumatic switching apparatus for a tape driving capstan assembly having a secondary effect on the brake elements such that the pressures in the brake elements are modified in accordance with the pressure signals to the capstan for driving the tape.

The above and other novel features which are characteristic of the invention are set forth with particularity in the appended claims. The invention, however, both as to its organization and method of operation together with further objects, features and advantages thereof can best be understood by reference to the following descriptive matter taken in conjunction with the accompanying drawings in which:

FIGURE 1 is a diagrammatic showing of a tape transfer apparatus incorporating the present invention;

FIGURE 2 is a front view of one preferred embodiment of capstan actuator valve and brake assembly, in accordance with the invention;

FIGURE 3 is a composite sectional view of the assembly of FIGURE 2 illustrating a floating disk actuator and a non-contacting capstan embodiment of the invention;

FIGURES 4 and 5 are front and side elevational views, partly in cross-section, of one preferred embodiment of non-contacting capstan construction in accordance with the invention;

FIGURE 6 is a sectional view of another embodiment of floating disk actuator and capstan construction illustrating in particular the contacting capstan and commutator construction in accordance with the invention;

FIGURES 7 and 8 are front and side elevational views, respectively, partly in cross-section of the capstan construction shown in FIGURE 6;

FIGURES 9, 10 and 11 are rear, front, and side sectional views, respectively, of the contacting commutator construction shown in FIGURE 6 of the drawing;

FIGURES 12 and 13 are plan and sectional views of a commutator element used in the capstan assembly of FIGURES 7 and 8;

FIGURES 14 and 15 are sectional views of the grooves cut in the capstan surfaces; and FIGURE 16 is a diagrammatic view, partly in cross-section, of a preferred embodiment of pneumatic actuator with secondary effect in accordance with the invention.

Referring now to the drawings, and more particularly to FIGURE 1 thereof, there is illustrated a magnetic tape handling mechanism 10 which is adapted to move a magnetic tape 12 from a supply reel to a take-up reel past a suitable electromagnetic information transfer head 14. In the particular embodiment of magnetic tape handling mechanism 10 shown, the magnetic tape 12 is adapted to be carried by a pair of reels 16 and 18 which are adapted to function as supply or take-up reels alternately for the storage tape 12. The tape is adapted to be driven in either direction past the information transfer head 14 associated with the tape by suitable capstan means discussed below.

When the reel 16 is serving as the supply reel, the tape 12 wound thereon is arranged to pass from the reel 16 into a first loop chamber 20, the latter providing a certain amount of slack in the tape between the reel 16 and the capstan-valve assembly 22. The capstan-valve assembly 22 advantageously includes a pair of contra-rotating capstans, pneumatic brake means, and suitable pneumatic actuator valve means for selectively applying differential pressures to the capstans and brake means in accordance with the control signals applied thereto to selectively control the tape movement with respect to the information transfer head 14.

On the other side of the capstan-valve assembly 22, there is provided a further loop chamber 24 which serves to provide slack in the tape 12 between the capstan-valve assembly 22 and the reel 18. Advantageously, the loop chambers 20 and 24 may have sub-atmospheric pressure supplied thereto to maintain a sub-atmospheric pressure below the tapes in the loop chambers, and for enabling the depth of the tape within the chambers to be sensed.

such as by suitable photoelectric or pneumatic sensing means.

As shown in greater detail in FIGURE 2 of the drawing, the capstan-valve assembly 22 comprises a pair of contra-rotating capstans 26 and 28, the former rotating counter-clockwise and the latter rotating clockwise. Capstans 26 and 28, as explained in greater detail below, are adapted to receive differential pressures for effecting movement of the tape 12 past the transfer head 14. The braking of the tape 12 with respect to the transfer head 14 is accomplished by means of the brake lane member 30 adjacent the capstan 26 and the brake lane member 32 adjacent the capstan 28. Advantageously, each brake lane member is of the pneumatic type and is adapted to communicate, by means of the pressure conduits 34, 36 and 38, with a vacuum source such that the tape 12 is maintained under tension as it is driven past the transfer head 14 by one or the other of the contra-rotating capstans 26 and 28.

In accordance with a feature of this invention, the drag or tension created by the vacuum supplied to the brake lane members 30 and 32 is sufficient to arrest tape movement when neither of the capstans 26 or 28 is in driving engagement with the tape. However, when the tape is placed in driving engagement with one of the capstans, by the application of a vacuum thereto, this driving force is sufficiently greater than the braking force to overcome the effects of the brake lane members on the tape so that it may slide over the brake surface as it is driven in the direction desired. This partial braking action stabilizes the tape in the vicinity of the transfer head. While one capstan is driving, the other may well have a positive pressure applied thereto whereby the flowing air forms a lubricating film separating the tape from the capstan.

As further shown in FIGURE 2, a source of above atmospheric pressure is provided for each capstan, such as by the pressure conduit 40 associated with capstan 26 and a source of partial vacuum is provided for each capstan, such as by the vacuum conduit 34 associated with capstan 26. In addition, an electro-pneumatic actuator valve assembly, such as that shown at 42, is provided for each capstan to selectively control the application of differential pressures to the capstans in accordance with the control signals.

FIGURE 3 illustrates the internal construction of an illustrative actuator valve and capstan assembly embodying the invention. In particular, FIGURE 3 illustrates such an assembly which comprises a freely movable or so-called "flying" disk actuator and a non-contacting capstan and commutator structure which advantageously may be used in a magnetic tape handling apparatus.

In accordance with a feature of the invention, the capstan 26 is provided with a plurality of transverse grooves 52 uniformly spaced around the circumference of the capstan 26. As shown in greater detail in FIGURES 4 and 5, the grooves 52 are transverse to the path of tape travel and parallel to the axis of rotation of capstan 26. The capstan 26 is fixedly secured to the motor shaft 48, as by means of the set screws and threaded bores 49 and 50, so as to rotate with the motor shaft when the capstan driving motor is energized. The capstan 26 is provided with a central recessed portion 70—as shown more clearly in FIGURE 5 of the drawing—within which is positioned a stationary seal commutator 72 adapted to communicate selected pneumatic pressures to the capstan grooves 52 as determined by the actuation of the pneumatic actuator valve apparatus associated with the capstan assembly.

The pneumatic actuator valve apparatus comprises an electromagnetic coil 68, positioned within the capstan-valve assembly 22 and adapted to be energized to cause either vacuum or pressure signals to be supplied to the grooves 52 of the capstan. As particularly shown in FIGURE 3, a conduit 58, connected with a source of vacuum communicates with the grooves 52 in the rotating capstan 26 by way of the O-ring 92, the ports 71 and 74, the O-ring 76, the port 80, the ports 82 and 83 in the stationary seal commutator assembly 72. Air at positive pressure is supplied the capstan-valve assembly through the port 85, the O-ring 84, the port 86, the ports 88 and 90 forming a passage around the coil 68, and through the opening provided by the O-ring 94 to the flying disk 66, which is shown in FIGURE 3 as being seated against the O-ring 94. The flying disk 66 is centered in position by a non-magnetic spacer 67. The positive pressure is sealed in the actuator assembly by means of the cross pin 64 and plug 62 directly below the coil 68, and advantageously, a coil spring 60 is provided between the plug 62 and the coil plug 63 to support the coil 68 in operative position. The magnetic circuit for the coil 68 is completed by way of the frame member 69.

In the operation of the capstan-valve assembly shown in FIGURE 3 of the drawing, the capstan 26 is rotated by the motor shaft 48, and when a vacuum is supplied to the grooves 52, the tape is pulled into operating engagement with the rotating capstan to drive the tape in the direction of rotation of the capstan.

Conversely, when the rotating capstan 26 is not intended to be in driving engagement with the tape, a pressure slightly above atmosphere is supplied to the capstan grooves 52 to blow the tape off of the capstan and thereby provide an air bearing for the tape. The brake may also be arranged to have a pressure applied thereto when there is a driving vacuum on one of the capstans as discussed below.

It is a feature of this invention that the rotatable capstan 26 and its associated stationary seal commutator 72, be positioned closely adjacent but in non-contacting relation with respect to each other to minimize frictional effects therebetween. However, those skilled in the art will appreciate that the clearance between the capstan and its commutator must be sufficiently small to enable the pressure from the commutator to be communicated to the grooves 52 of the capstan without excessive leakage.

As shown in FIGURE 3, the pneumatic actuator valve apparatus of this illustrative embodiment of the invention comprises a freely movable or flying disk 66 which is positioned in the pressure passage 71 leading to the commutator-capstan assembly. Advantageously, one face of the disk 66 is adapted to abut the O-ring 92 at the vacuum inlet port 58 while the other face of the disk 66 is adapted to abut the O-ring 94 at the pressure inlet which reaches the disk from the pneumatic passages provided around the coil 68.

In the operation of the pneumatic actuator valve apparatus, the flying disk 66 normally is seated in sealing engagement with the O-ring 92 at the vacuum opening, by the differential pressures on its opposing faces, and a positive pressure is communicated to the capstan grooves 52 through the pressure passages heretofore described. During this time—while pressure is supplied to the capstan grooves—the tape is not in driving engagement with the capstan surface and, in fact, the positive pressure at the capstan surface serves as an air bearing for the tape so that there will be no undesirable contact with the capstan.

When it is desired to drive the tape in the direction of capstan rotation, the coil 68 is electrically energized to seat the flying disk 66 in sealing engagement with the O-ring 94 to cut off the positive pressure which heretofore has been supplied to the capstan grooves 52. This opens the inlet to vacuum supply ports 58 at the O-ring 92 to permit the vacuum to be communicated to the capstan grooves 52. The resultant pressure differential at the capstan surface causes the tape to move into engagement therewith, and the tape is driven in the desired direction. Those skilled in the art will now appreciate that the flying disk 66 serves as a low mass and substantially frictionless valve to supply either above atmospheric pressure or a vacuum to the capstan in accordance with the energization of the coil 68. Further, the minimal mass and friction components of the flying disk 66 enables the switching operation to be effected quickly, consistently and at high rates in response to the control signals which energize or de-energize the coil 68.

In the illustrative embodiment of the invention shown in FIGURES 6 through 13 of the drawings, the stationary seal commutator 106 is adapted to be in abutting and rubbing relationship with a sealing disk 107 carried by the rotating capstan 102. In this embodiment, as particularly shown in FIGURES 7 and 8 of the drawing, the rotating capstan 102 comprises a plurality of grooves 52 uniformly spaced around the capstan circumferential surface. As in the case of capstan 26 described above, the grooves are transverse to the path of tape travel and are parallel to the axis of rotation of the capstan. A plurality of ports 104 are provided within the capstan, with openings at the edge and on one side face thereof, so as to communicate the fluid pressures supplied to the side face of the transverse grooves 52. As shown in FIGURE 6, the capstan 102 is fixedly secured to the motor shaft 48 for rotation against one face of the stationary seal commutator 106. The face of the capstan 102 has an annular groove therein for receiving a ported bearing disk 107. The hole in the disk, as illustrated in FIGURES 12 and 13, are adapted to communicate with the ports 104 in the capstan.

In this illustrative embodiment, the stationary seal commutator 106 is in the form of a disk having one face thereof in abutting relationship with the rotating capstan 102 such that the capstan is in rotating rubbing engagement with the ring 107 in the commutator face. As shown in greater detail in FIGURES 9, 10 and 11 of the drawing, the commutator disk 106 comprises a central recess 118 which is adapted to receive the fastening screw 112 that fixedly secures the commutator to the actuator assembly housing.

Openings 120 and 122 are provided at the opposite faces of the commutator disk for providing selected fluid pressures to the ports 104 of the capstan 102. As shown in FIGURES 9 and 10 of the drawing, the face of the commutator 106 which abuts the capstan 102 has an arcuate opening 120 to the end that a number of ports 104 are in communication with the opening 120 at any given time during the rotation of the capstan 102. This enables a plurality of the grooves 52 to be supplied with fluid pressure to the end that the tape either be firmly engaged with the capstan surface when a vacuum is supplied to the ports 104, or in the alternative, to the end that the tape is blown off of the capstan surface and an air bearing is provided therefor when positive pressure is supplied to ports 104.

The vacuum is supplied to the commutator openings 120 and 122 through a pressure conduit 108 and a port 114 which are in communication with the flying disk actuator valve assembly. In particular, the port 114 is in communication with the flying disk 66, and as explained heretofore, the energization of the relay coil 68 determines the position of the flying disk 66 as being seated against the O-ring 92 wherein positive pressure is supplied to the commutator 106 and capstan 102, or as being seated against the O-ring 94 wherein a vacuum is supplied to the commutator 106 and capstan 102.

To insure the positive positioning of the commutator disk 106 against the disk 107 in the rotating capstan 102, coil spring means are provided, such as the spring 110 which is seated within a recess 116 of the stationary seal commutator 106. This serves to keep the commutator 106 firmly engaged with the disk 107 in the side face of rotating capstan 102.

In order to insure the positive reaction of the tape to pressure and vacuum signals at the brakes or at the capstans, the capstan surfaces are advantageously formed with grooves whose surface is accurately cut in the manner illustrated in FIGURES 14 and 15. The grooves 52 have the outer surfaces thereof opened as at 53 by way of a ball end mill to cut down the land surface between the grooves. This will minimize the tendency for the tape to trap air thereunder and thereby minimize the tendency of the tape to slip or skew as the control pressures are applied thereto. Further, the grooves 52 are formed with maximum volume under the center of the tape so that the application of a vacuum thereto causes the tape to be gripped at the center first. The gripping action is then transferred to the edges. With the gripping occurring at the center first, the tape is acted on uniformly to prevent any twisting or skewing of the tape as it is being coupled to the capstan.

In accordance with a further embodiment of the invention, the actuator valve assembly is supplied with an additional or secondary flying disk actuator to provide a secondary effect that serves to lessen the vacuum at a brake lane when the capstan associated therewith is in driving engagement with the tape. A specific illustrative embodiment of actuator valve assembly with secondary effect is shown in FIGURE 16 of the drawing. The actuator valve assembly comprises a housing body 130 which has positioned therewithin a main actuator valve assembly and a secondary valve assembly for each of the two contra-rotating capstans. The main actuator valve assembly for the capstan 26 is shown diagrammatically as 42 in the drawing and the secondary actuator valve assembly associated therewith is shown at 132, with communicating or connecting pressure conduit 134 provided therebetween. The working air passage or output pressure conduit of the main actuator valve assembly is shown at 136. As explained heretofore, the pressure output of the working air passage 136 is supplied to the commutator and capstan, either as a vacuum or a pressure dependent upon the energized condition of the coil and the position of its associated flying disk.

The secondary actuator 132 also comprises a flying disk 138 having one face thereof in pressure communication with the connecting conduit 134 from the primary actuator valve assembly. The other face of the flying disk 138 of the secondary actuator valve assembly is in pressure communication with a source of positive pressure through the ports 142 and 144, and it also is in communication with the working air passage 140 to the brake lane member 30 associated with the capstan 26 having the same relationship as shown in FIGURE 2. In the illustrative embodiment in FIGURE 16, the working air passage 140 of the secondary actuator 132 advantageously may be in communication with the brake lane member 30.

The operation of this embodiment of the invention can now be fully understood. When the output to the capstan of the primary actuator 42 is a positive pressure, the secondary flying disk 138 is depressed by the differential pressure thereon to seal the brake lane port 140 and thereby prevent a pneumatic pressure from being applied thereto. Thus, at this time, the constantly applied vacuum or sub-atmospheric pressure is maintained at the brake lane member to serve as a tape drag or tensioner when its associated capstan 26 is not in driving engagement with the tape.

However, when the coil of primary actuator 42 is energized to apply vacuum to the capstan 26, to bring the tape into driving engagement therewith, this vacuum also is communicated through the connecting passage 134 to the flying disk 138 of the secondary actuator 132. The differential pressure now applied to disk 138 causes it to rise to open the communicating path between the pressure source and the working air passage 140 leading to the brake lane member. This permits pressure to bleed or leak from the ports 142 and 144 into the port 140 and thence into the brake lane member. The brake lane member has a vacuum constantly applied thereto, as explained heretofore. The coupling to the vacuum source, however, is such that the impedance thereof is higher than the impedance of the pressure connection. This insures that the effect of the pressure will override the effect of the vacuum on the brake surface. Thus, the addition of the above atmospheric pressure at this time modifies the brake vacuum so that the tape is slightly released from the brake lane member when its associated capstan is driving the tape. Manifestly, as will be appreciated by those skilled in the art, this modification of the vacuum on the brake lane member associated with the driving capstan serves to speed up tape start, and since normal vacuum is maintained at the other brake lane, the tape is properly tensioned across the information transfer head.

From the foregoing description, it will readily be apparent that there has been provided a new and improved tape control apparatus of the pneumatically actuated type which is particularly adapted for rapid changes in the position of the tape with respect to an information transfer head. Further, it will be appreciated that these rapid changes may be achieved without introducing errors into the information transfer operation, and that an improved control of the tape motion has been provided. While several preferred embodiments of the invention have been shown, it will be readily apparent to those skilled in the art that these preferred embodiments are merely illustrative of the principles of the invention, and that many changes may be made without departing from the spirit of the invention as set forth in the appended claims.

What is claimed as the invention is:

1. Improved apparatus for controlling the movement of a record tape comprising a rotatable cylindrical member forming a capstan having a circumferential surface adapted to engage the record tape, said circumferential surface being divided into a plurality of grooves each extending substantially across the surface of said capstan and being transverse to the path of tape travel and parallel to the axis of rotation of said capstan, a plurality of air passages formed within said cylindrical member in air communication with said grooves, said cylindrical member being formed with a co-axial, recessed portion to define an annular flange containing said plurality of grooves and air passages, a stationary air flow distributing member positioned within said recessed portion and having an outer diameter smaller than the inner diameter of said annular flange to provide a uniformly spaced clearance therebetween such that the capstan and the air flow distributing member are in closely adjacent but non-contacting relation relative to each other during the rotation of the capstan annular flange around the distributing member, and means defining an air flow passage in said distributing member for supplying air to the grooves which are placed sequentially in operative relation to the record tape during the rotation of said capstan.

2. Improved apparatus for controlling the movement of an elongated, flexible record tape comprising, in combination, a rotatable capstan having a perforated circumferential surface adapted to engage the record tape, a plurality of air flow passages formed within said capstan in air communication with the perforations, a stationary air flow distributing member operatively positioned adjacent the capstan for distributing air at selectively controlled pressures to the perforations to control the movement of said record tape, said distributing member having air flow passage means defined therein for supplying air only to those grooves which are placed in operative relation to the record tape during the rotation of said capstan, and electro-pneumatically controlled switching means for supplying air at positive or sub-atmospheric pressures to said air flow distributing member comprising a housing having an air working passage in air communication with said distributing member, a freely movable floating metallic disk of low mass positioned in said air working passage, a first port in communication with a source of vacuum adjacent one face of said disk, a second port in communication with a source of pressure adjacent the opposite face of said disk, whereby the differential pressure on said disk normally causes the disk to be in sealing engagement with said first port to enable pressure to be supplied through said working air passage to the capstan perforations to remove the tape from driving engagement with the capstan, and electromagnetic coil means positioned in operative relation with said disk and adapted when energized to place the disk in sealing engagement with said second port to enable vacuum to be supplied through said working air passage to the capstan perforations to place the tape into driven engagement with the capstan.

3. Improved apparatus for controlling the movement of an elongated, flexible record tape comprising, in combination, a rotatable capstan having a perforated circumferential surface adapted to engage the record tape, a stationary air flow distributing member operatively positioned adjacent the capstan for distributing air at selectively controlled pressures to the perforations to control the movement of said record tape, and electro-pneumatically controlled switching means for supplying air under pressure or a vacuum to said air flow distributing member comprising a housing having an air working passage in air communication with said distributing member, a freely movable floating metallic disk of low mass positioned in said air working passage, a first port in communication with a source of vacuum adjacent one face of said disk, a second port in communication with a source of pressure adjacent the opposite face of said disk, whereby the differential pressure on said disk normally causes the disk to be in sealing engagement with said first port to enable pressure to be supplied through said working air passage to the capstan perforations to remove the tape from driven engagement with the capstan, and electromagnetic coil means positioned in operative relation with said disk and adapted when energized to place the disk in sealing engagement with said second port to enable vacuum to be supplied through said working air passage to the capstan perforations to place the tape into driven engagement with the capstan.

4. Improved apparatus for supplying air pressures to a perforated capstan for moving a magnetic tape comprising electro-pneumatically controlled switching means for supplying air at positive or sub-atmospheric pressures to said capstan including a housing having an air working passage in air communication with said capstan, a freely movable floating metallic disk of low mass positioned in said air working passage, a first port in communication with a source of sub-atmospheric pressure adjacent one face of said disk, a second port in communication with a source of positive pressure adjacent the opposite face of said disk, whereby the differential pressure on said disk normally causes the disk to be in sealing engagement with said first port to enable positive pressure to be supplied through said working air passage to the capstan perforations to remove the tape from driven engagement with the capstan, and electromagnetic coil means positioned in operative relation with said disk and adapted when energized to place the disk in sealing engagement with said second port to enable sub-atmospheric pressure to be supplied through said working air passage to the capstan perforations to place the tape into driven engagement with the capstan.

5. Improved apparatus for controlling the movement of an elongated, flexible record tape comprising in combination, a rotatable capstan having a perforated circumferential surface adapted to engage the record tape, a plurality of air flow passages formed within said capstan in air communication with said perforations, a stationary air flow distributing member operatively positioned adjacent the capstan for distributing air at selectively controlled pressures to the perforations to control the movement of said record tape, said distributing member having air flow passage means defined therein for supplying air only to those grooves which are placed in operative relation to the record tape during the rotation of said capstan, a perforated brake lane for said tape adjacent said capstan, means supplying air at sub-atmospheric pressure to said brake lane to apply a drag to the movement across said lane, electro-pneumatically controlled switching means comprising a housing having a working air passage in air communication with said distributing member, a freely movable metallic disk of low mass positioned in said working air passage, a first port in communication with a source of sub-atmospheric pressure adjacent one face of said disk, a second port in communication with a source of positive pressure adjacent the opposite face of said disk, an electro-magnetic coil positioned adjacent said opposite face of said disk whereby the disk is in sealing engagement with said first port to permit positive pressure to be supplied to the capstan when the coil is not energized and the disk is in sealing engagement with the second port to permit sub-atmospheric pressure to be supplied to the capstan when the coil is energized, secondary pneumatically controlled switching means having a first port in air communication with the working air passage of said first switching means, a second port in communication with said brake lane, a secondary freely movable metallic disk of low mass positioned intermediate the first and second ports of said secondary switching means, and a source of positive pressure adapted to be placed in communication with said second port to modify the sub-atmospheric pressure at the brake lane only when a sub-atmospheric pressure is supplied to the working air passage of the electro-pneumatically controlled switching means to place the secondary disk in sealing engagement with the first port whereby the tape drag at the brake lane is modified whenever its associated capstan is placed into driving engagement with the tape.

6. Improved apparatus for controlling the movement of an elongated, flexible record tape comprising in combination, a rotatable capstan having a perforated circumferential surface adapted to engage the record tape, a perforated brake lane for said tape adjacent said capstan, means supplying air at sub-atmospheric pressure to said brake lane to apply a drag to the movement across said lane, electro-pneumatically controlled switching means comprising a housing having a working air passage in air communication with said capstan, a freely movable metallic disk of low mass positioned in said working air passage, a first port in communication with a source of sub-atmospheric pressure adjacent one face of said disk, a second port in communication with a source of positive pressure adjacent the opposite face of said disk, an electro-magnetic coil positioned adjacent said opposite face of said disk whereby the disk is in sealing engagement with said first port to permit positive pressure to be supplied to the capstan when the coil is not energized and the disk is in sealing engagement with the second port to permit sub-atmospheric pressure to be supplied to the capstan when the coil is energized, secondary pneumatically controlled switching means having a first port in air communication with the working air passage of said first switching means, a second port in communication with said brake lane, a secondary freely movable metallic disk of low mass positioned intermediate the first and second ports of said secondary switching means, and a source of positive pressure adapted to be placed in communication with said second port to modify the sub-atmospheric pressure at the brake lane only when a sub-atmospheric pressure is supplied to the working air passage of the electro-pneumatically controlled switching means to place the secondary disk in sealing engagement with the first port whereby the tape drag at the brake lane is modified whenever its associated capstan is placed into driving engagement with the tape.

References Cited in the file of this patent
UNITED STATES PATENTS

| | | |
|---|---|---|
| 1,805,197 | Wood | May 12, 1931 |
| 2,747,025 | Selsted | May 22, 1956 |
| 2,778,634 | Gams et al. | Jan. 22, 1957 |
| 2,837,330 | Lawrance et al. | June 3, 1958 |
| 2,848,188 | Witzel | Aug. 19, 1958 |
| 2,866,637 | Pendleton | Dec. 30, 1958 |
| 2,867,436 | Miller | Jan. 6, 1959 |
| 2,954,911 | Baumeister et al. | Oct. 4, 1960 |
| 3,013,487 | Faeber | Dec. 19, 1961 |